(12) United States Patent
Tarhan et al.

(10) Patent No.: US 8,746,421 B2
(45) Date of Patent: Jun. 10, 2014

(54) BLOCKING DEVICE, GEAR-DRIVE UNIT CONTAINING SUCH A BLOCKING DEVICE, AND METHOD FOR PRODUCING SUCH A GEAR-DRIVE UNIT

(75) Inventors: Recep Tarhan, Buehlertal (DE); Christian Meyer, Karlsruhe-Wolfartsweier (DE); Ulrich Rettmar, Buehlertal (DE); Gerd Walter, Rohrwiller (FR); Stefan Demont, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 1199 days.

(21) Appl. No.: 10/591,896

(22) PCT Filed: Oct. 5, 2005

(86) PCT No.: PCT/EP2005/055001
§ 371 (c)(1),
(2), (4) Date: Sep. 7, 2006

(87) PCT Pub. No.: WO2006/058803
PCT Pub. Date: Jun. 8, 2006

(65) Prior Publication Data
US 2007/0187193 A1    Aug. 16, 2007

(30) Foreign Application Priority Data
Dec. 1, 2004 (DE) .......................... 10 2004 058 096

(51) Int. Cl.
*B60T 13/04* (2006.01)
(52) U.S. Cl.
USPC .............. 188/171; 188/31; 188/161; 188/69; 188/162; 188/163

(58) Field of Classification Search
USPC .............. 188/31, 161, 171, 69, 162, 163, 265
See application file for complete search history.

(56) References Cited

U.S. PATENT DOCUMENTS

| 3,096,863 | A | * | 7/1963 | Shefke ............................. 192/90 |
| 4,398,110 | A | | 8/1983 | Flinchbaugh et al. |
| 5,080,214 | A | * | 1/1992 | Fossum ....................... 192/84.92 |
| 6,269,917 | B1 | * | 8/2001 | Harting et al. ................ 188/161 |

(Continued)

FOREIGN PATENT DOCUMENTS

| DE | 101 03 736 | 8/2002 |
| DE | 102 36 372 | 2/2004 |
| EP | 0 957 565 | 11/1999 |
| EP | 1 320 175 | 6/2003 |

*Primary Examiner* — Robert A Siconolfi
*Assistant Examiner* — Mahbubur Rashid
(74) *Attorney, Agent, or Firm* — Michael J. Striker

(57) ABSTRACT

A blocking device, and a gear-drive unit containing such a blocking device, and a method for producing such a gear-drive unit for blocking a rotary motion of a shaft (14) relative to a housing (16) of the gear-drive unit (10), having a first, rotatable blocking element (32) and a second blocking element (34) which is displaceable relative to the first blocking element (32) by means of at least one electromagnet (44) and at least one restoring element (42), in which the blocking elements (32, 34) in the blocked state mesh in the axial direction with one another by form-locking, and the blocking device (30) is embodied as a separate, independent structural unit (31), which can be mounted as a unit (31) on the one hand onto the housing (16) and on the other onto the shaft (14).

7 Claims, 3 Drawing Sheets

(56) References Cited

U.S. PATENT DOCUMENTS 6,459,182 B1 * 10/2002 Pfann et al. .................. 310/77
2001/0041637 A1 * 11/2001 Leeper ........................ 475/85
2003/0136618 A1 7/2003 Frey
2006/0105877 A1 5/2006 Bornchen et al.

* cited by examiner

BLOCKING DEVICE, GEAR-DRIVE UNIT CONTAINING SUCH A BLOCKING DEVICE, AND METHOD FOR PRODUCING SUCH A GEAR-DRIVE UNIT

PRIOR ART

The invention relates to a blocking device having two blocking elements located displaceably relative to one another, and to a gear-drive unit containing such a blocking device as well as to a method for producing a gear-drive unit, as generically defined by the preambles to the independent claims.

With European Patent Disclosure EP 1 320 175 A2, a drive and/or braking mechanism has become known in which a brake unit is located inside a housing that surrounds an electric motor. The brake unit has a brake disk and a brake body, which can be pressed against one another electromagnetically by friction-locking. The brake body is connected to the housing of the electric motor in a manner that is both axially fixed and fixed against relative rotation, while the brake disk is located axially displaceably on the rotatably supported armature shaft of the electric motor.

A braking device designed in this way has the disadvantage that upon installation of the drive unit, many tolerances must be compensated for, since upon assembly the brake body is pre-installed directly on the housing and the brake disk is pre-installed on the armature shaft and only after that are they put together and adjusted relative to one another. Moreover, the friction lock between the two brake disks is very vulnerable to wear and such external factors as dirt, carbon dust, grease and jarring, which is why in EP 1 320 175 A2 the housing of the electric motor must also be closed off in a water-tight, air-tight and dust-tight way.

ADVANTAGES OF THE INVENTION

The gear-drive unit of the invention, and the blocking device located in it, as well as the method for producing such a gear-drive unit all have the advantage that because of the embodiment of the blocking device as an independent module that can be fully assembled, the effort and expense for assembling such a gear-drive unit are reduced markedly. High-precision mounting of the slaving means on the shaft relative to the blocking device and high positional precision of the blocking device in the housing of the gear-drive unit are unnecessary. The axial tolerances (air gap) between the blocking elements can be maintained with markedly less effort in the separate production and independent function checking of the blocking device. Because of the embodiment of an axial form lock between the two blocking elements, the blocking device is much less vulnerable to dirt and grease. Because of the minimal wear or abrasion of the blocking elements, the service life and durability of the blocking device are enhanced. Because of the embodiment of the axial form lock between the two blocking elements, for instance in the form of an axial toothing, the blocking device is also suitable for use in the motor vehicle, where increased stresses from vibration and jarring occur. In contrast to the location of brake disks, our invention is insensitive to a resonant frequency of the spring mass system that is excited by the vibrations in the vehicle.

If the form lock between the blocking elements is formed by radially located grooves and teeth engaging them, then the torque of the drive can be blocked very effectively and reliably with little influence from ambient conditions. As a result of the form lock, slip and abrasion between the blocking elements, even in the presence of vibrational excitation or dampness or carbon dust, are reliably averted.

For manufacturing the blocking device that can be separately assembled, it is especially favorable to mount the two blocking elements with the electromagnet and the restoring element inside a barrier housing, which can then in turn be installed simply in the housing of the gear-drive unit. The barrier housing absorbs the forces acting on the blocking device at that time and carries them away to the housing of the gear-drive unit. Simultaneously, the barrier housing, if it is for instance embodied as nearly closed, protects the blocking elements against dirt.

For simple mounting of the blocking device on the driveshaft in a way that is invulnerable to tolerances, the first blocking element has radial moldings at a central opening, which are engaged by corresponding radial extensions of the driveshaft upon installation. As a result, a form lock that is insensitive to tolerances is created, which transmits the drive moment to the first blocking element and at the same time allows an axial play between the drive shaft and the blocking device. The form lock is attained especially simply by means of an outer toothing on the drive shaft that engages a corresponding inner toothing in the first blocking element.

It is advantageous to operate the blocking device in such a way that during the operating state the at least one electromagnet is activated, so that it keeps the second blocking element axially away from the first blocking element, counter to a restoring force. As a result, the drive shaft can rotate unimpeded in the state in which current is supplied to the electromagnet. In the deactivated state of the electromagnet (when it is not supplied with current), the second blocking element is then pressed against the first blocking element, because of the pressing force of the restoring element, in order to block the rotary motion in the blocked state.

So that in the rotating state the two blocking elements located in the barrier housing will not touch one another axially, the barrier housing has at least one axial stop, on which the rotatable first blocking element is braced axially.

It is advantageous if the barrier housing has a stop disk, on the two axial end faces of which the rotatable first blocking element is braced with axial extensions. The strutlike extensions have counterpart stops, which are embodied as extending partway around or all the way around tangentially. It is assured, with only slight friction losses, that the movable blocking element in the rotating state does not axially engage the second blocking element that is connected to the electromagnet.

For simple mounting, the axial extensions are embodied for instance as detent or clip hooks. Alternatively, after the radial extensions are introduced through the central recess in the stop disk, the counterpart stop can be formed by means of securing elements or by radial material deformation.

If the electrical contacts of the electromagnet are embodied as spring elements that extend axially along the face end of the electromagnet, then mounting is simplified, since a blind joining operation can then be employed. The spring elements are secured in the electromagnet and have a contact surface area that is suitable for transmitting current.

The second blocking element, connected to the electromagnet, can be axially guided especially simply by having axial moldings which engage corresponding counterpart moldings of a coil holder of the electromagnet. As a result, no additional components are necessary, since the axial guiding and counterpart guiding elements can each be formed integrally onto the second blocking element or onto the mount of the electromagnet.

If the faces of the two blocking elements that form the form lock are embodied at least in part of an elastic material, such as plastic, and in particular an elastomer, then the noise that develops as the two blocking elements slip through counter to one another in an emergency operation situation can be reduced markedly.

If the blocking device is built in as a pre-assembled separate structural unit into the housing of the gear-drive unit, then it is advantageous if the blocking device rests axially on a roller bearing, located in the housing, whose inner ring receives the drive shaft. To that end, a slaving means is advantageously secured to the drive shaft in a manner fixed against relative rotation and is received by a roller bearing embodied as a loose bearing, in order to compensate for any axial play that may occur, caused for instance by temperature stress or mounting tolerances.

In a preferred version, the roller bearing is fixedly located on the blocking device, for instance press-fitted into the barrier housing, so that one additional mounting step for the roller bearing is eliminated.

If the first blocking element is directly braced on the inner ring, which revolves with the shaft, then the friction losses in rotary operation between the first blocking element and the inner ring can be eliminated or minimized. If the roller bearing is fixedly connected to the barrier housing, then the inner ring forms an axial stop that rotates with it for the first blocking element.

To avoid mutual contact of the two blocking elements, the first, rotatable blocking element is braced on the diametrically opposed axial side of the drive shaft. To that end, the slaving means has a radial protrusion, on which the first blocking element is axially braced after the slaving means has been introduced into the blocking device.

In view of the jarring and vibrational stress in the motor vehicle, it is advantageous if the first blocking element is pressed in prestressed fashion against the inner ring of the roller bearing. To that end, between the first blocking element and at least one of the two stops (the inner ring or the radial collar of the slaving means), an elastic element is provided, which compensates for a longitudinal motion of the drive shaft relative to the blocking device secured in the housing.

The method of the invention for producing a gear-drive unit of the invention has the advantage that because of the separate embodiment of the blocking device with the two blocking elements, can easily be mounted, without major requirements in terms of tolerances, in the housing and onto the drive shaft. To that end, the drive shaft is received on the one hand in the roller bearing embodied as a loose bearing, and on the other a form lock with the first blocking element for transmitting torque is established.

The installation of the blocking device in the housing of the drive unit is done especially favorably by press-fitting and ensuing axial securing by means of material deformation. The axial positioning of the blocking device is not critical, since the spacing of the two blocking elements is adjusted by means of the stops of the barrier housing and of the drive shaft.

In a preferred manufacturing method, an axial positioning of the first, rotatable control element relative to the second blocking element is effected by providing that upon installation of the shaft with the slaving means, the slaving means presses the first blocking element axially resiliently against the stop of the barrier housing or of the housing. The prestressing force can be predetermined to suit the desired use (vibration stress) by means of the choice of the spring constant of the elastic element.

Because of the complete preassembly of the blocking device with the two blocking elements, the electromagnet, and the at least one restoring element, this blocking device embodied as a separate structural unit can be manufactured independently by a vendor and monitored as to its function and power consumption. As a result, installing and monitoring the function of the gear-drive unit are simplified substantially.

DRAWINGS

Various exemplary embodiments of a blocking device of the invention and a gear-drive unit are shown in the drawings and described in further detail in the ensuing description.

DESCRIPTION OF THE EXEMPLARY EMBODIMENTS

Figure 1:
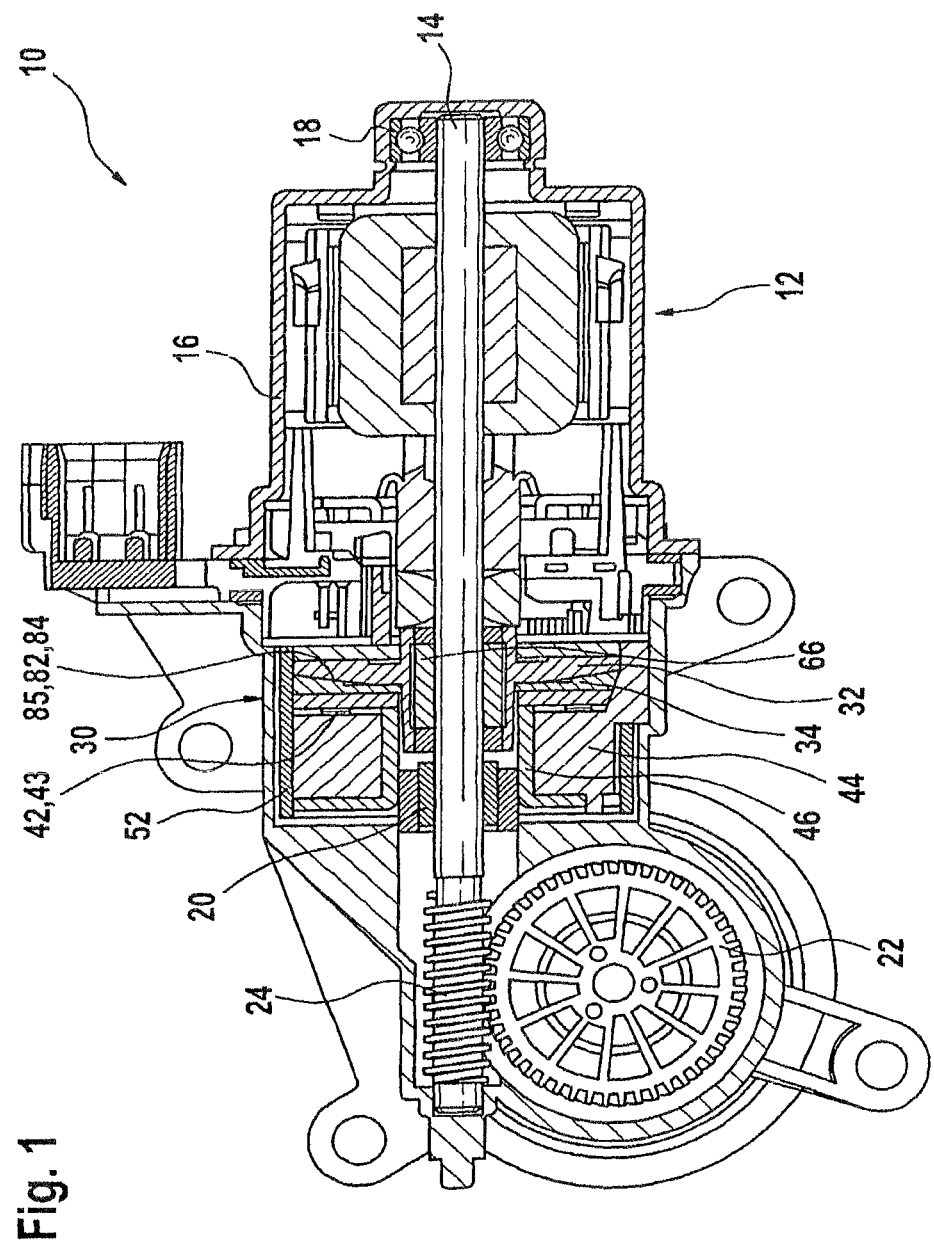
FIG. 1 is a section through a blocking device of the invention that is built into a gear-drive unit.

In FIG. 1, a gear-drive unit is shown, in which an electric motor 12 with a drive shaft 14 is located inside a housing 16 of the gear-drive unit 10. The drive shaft 14 is supported by means of a roller bearing 18 and/or a slide bearing 20 and has a worm 24, which cooperates, for instance via a worm wheel 22, with a final control element, not shown, of a moving part in the motor vehicle. To block the drive shaft 14 relative to the housing 16, a blocking device 30, which has a first blocking element 32 and a second blocking element 34, is located in the housing 16. The first blocking element 32 meshes in form-locking fashion with a slaving means 66, which is located on the armature shaft 14 in a manner fixed against relative rotation. The second blocking element 34, conversely, is connected to the housing 16 in a manner fixed against relative rotation. In the blocked state (as shown in FIG. 1), the first blocking element 32 meshes in form-locking fashion with the second blocking element 34, and as a result a rotation of the drive shaft 14 is prevented. To that end, the two blocking elements 32, 34 have radially extending grooves 82 and raised areas 84, which are pressed into one another in the manner of an axial toothing 85 by means of at least one resilient restoring element 42. In the exemplary embodiment, the faces meshing in form-locking fashion with one another of the blocking elements 32, 34 are located at an angle of less than or greater than 90° relative to the shaft 14. The second blocking element 34 is operatively connected to an electromagnet 44, which in the state in which it is supplied with current pulls the second blocking element 34 axially away from the first blocking element 32, counter to the spring force of the restoring element 42, in such a way that the axial form lock 85 is undone and allows the two blocking elements 32 and 34 to rotate in contactless fashion relative to one another. The electromagnet 44 is supported in a coil holder 46, which on the one hand is connected to the housing 16 in a manner fixed against relative rotation and on the other has axial guide elements 78, which cooperate with corresponding axial counterpart guides 80 of the second blocking element 34. As a result, it is assured that when a current is applied to the electromagnet 44, the blocking device 30 is in the rotating state, while conversely the currentless state corresponds to the blocked state. According to the invention, the blocking device 30 forms a separate preassembled structural unit 31, which includes at least the two blocking elements 32, 34 and the electromagnet 44. In FIG. 1, these are all located in a barrier housing 52 of the blocking device 30, and the barrier housing 52 is press-fitted axially into the housing 16 and is secured against shifting.

Figure 2:
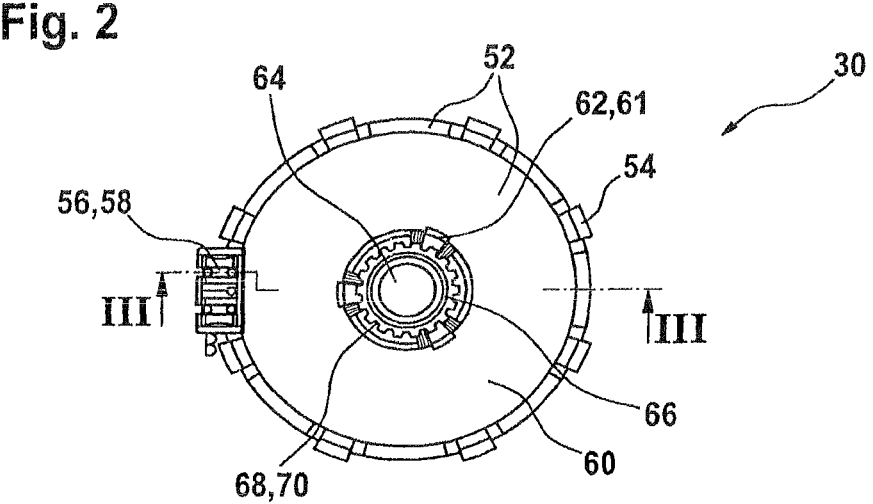
FIG. 2 is an axial section through the blocking device of FIG. 1.

FIG. 2 shows a view of the separately embodied blocking device 30 in the axial direction before it is built into the gear-drive unit 10. The two blocking elements 32 and 34 along with the electromagnet 44 are located in the barrier housing 52. The barrier housing 52 is cylindrical and on its circumference has radial detent elements 54, which on being built into the housing 16 dig firmly into it. A plug element 58, which can be supplied with current independently of the current to the electric motor 12, is located, as an electrical contacting means 56 of the electromagnet 44, on the circumference of the barrier housing 52. The face end of the barrier housing 52 is embodied as a stop disk 60, on which the first blocking element 32 is axially braced via axial extensions 62. The first blocking element 32 is embodied as a disk with a central opening 64, which in form-locking fashion engages a slaving means 66. The form lock is formed in this exemplary embodiment by an inner toothing 68 of the first blocking element 32, and this inner toothing is slipped over onto an outer toothing 70 of the slaving means 66. Upon assembly of the gear-drive unit 10, the slaving means 66 is first secured to the drive shaft 14 in a manner fixed against relative rotation, and then the drive shaft 14 with the slaving means 66 is thrust axially into the opening 64 in the blocking device 30. Since the first blocking element 32 is axially braced inside the barrier housing 52, the axial positioning of the drive shaft relative to the blocking device 30 is not vulnerable to tolerances.

Figure 3:
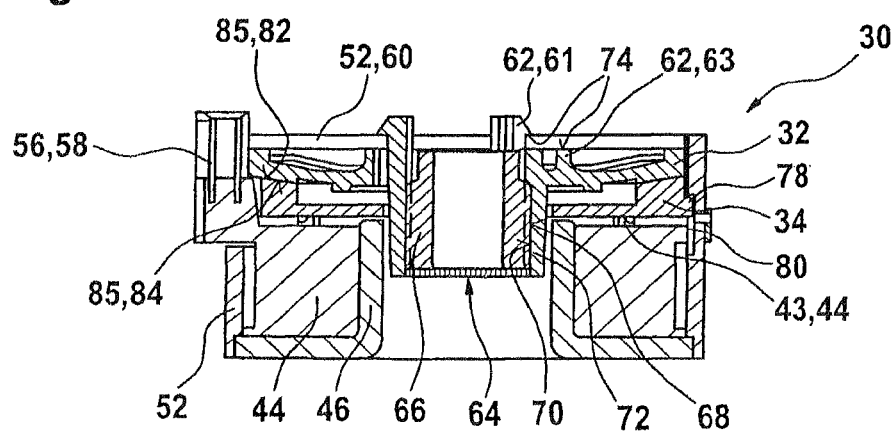
FIG. 3 is a section through the blocking device of FIG. 2 along the line III-III.

FIG. 3 shows a section along the line III-III through the blocking device 30 of FIG. 2; for the sake of illustration, the slaving means 66 is shown without the drive shaft 14, in form-locking engagement with the first blocking element 32. The first blocking element 32, at its central opening 64, has a bush 72, onto which the inner toothing 68 is integrally formed. For axial bracing against the inner wall of the stop disk 60, the first blocking element 32 has, as axial extensions 62, a strut 63 extending all the way around, which is braced on the stop 74, the latter being fixed against relative rotation and formed by the inner wall of the stop disk 60. For bracing relative to the electromagnet 44, the first blocking element 32 has further axial extensions 62, which are embodied as detent hooks 61 and contact the outer wall—which forms a further stop 74—of the stop disk 60 through the central opening 64 of the stop disk 60. The detent hooks 61 are cut free relative to the bush 72, so that they can be thrust flexibly through the opening 64 and then will securely lock in place. In this way, the first blocking element 32 is reliably secured in a simple way against axial shifting inside the barrier housing 52. In an alternative version, not shown, the axial extensions 62 are braced by material deformation on the outside of the stop disk 60, or the axial extensions 62 are embodied as a dome which is braced on the stop disk 60 by means of a clamping ring.

The electromagnet 44 is located on the coil holder 46, which simultaneously forms one part of the barrier housing 52. The second blocking element 34 is located in the barrier housing 52 in a manner fixed against relative rotation via axial guide elements 78, and the guide elements 78 cooperate with corresponding counterpart elements 80 of the barrier housing 52. In the blocked state, the second blocking element 34, embodied as a disk, is pressed in form-locking fashion against the first blocking element 32 by the restoring element 42. If current is supplied to the electromagnet 44, the blocking element 34 is pulled downward, in terms of FIG. 3, by the magnetic force, as a result of which the form lock 85 of the blocked state is undone, and the first blocking element 32 can rotate without friction relative to the second blocking element 34. The restoring element 42 is embodied for instance as a plurality of spring elements 43 or as a single spring element 43 surrounding the central opening 64. To embody as axial form lock 85 in the blocked state, the blocking elements 32 and 34 each have radially extending indentations 82 and raised areas 84, which are for instance embodied as an axial toothing 85.

Figure 4:
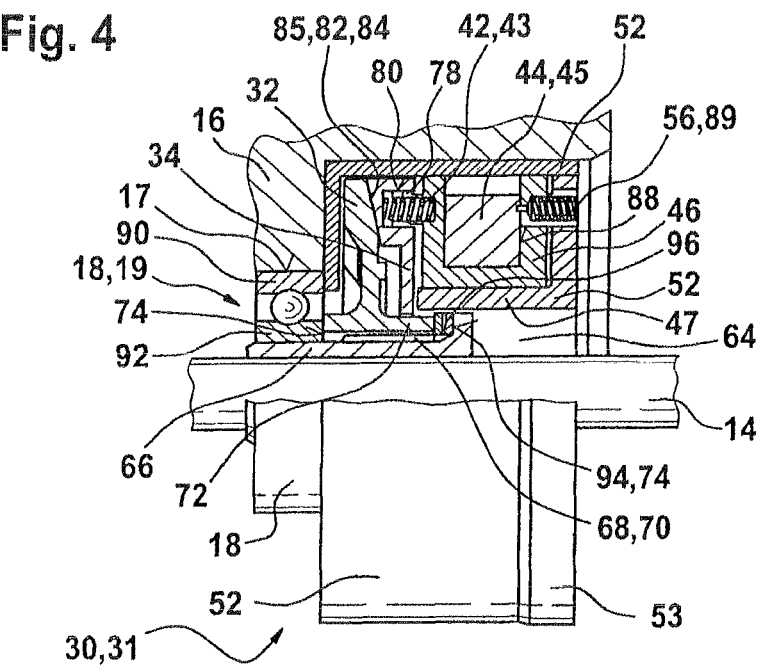
FIG. 4 is a section through a further exemplary embodiment in the built-in state.

In FIG. 4, a further exemplary embodiment of a blocking device 30 is shown, in the state in which it has been built into the housing 16. Once again, the electromagnet 44, the second blocking element 34 connected to the housing 16 in a manner fixed against relative rotation, and the first blocking element 32, which is rotatable by means of the drive shaft 14, are located inside the barrier housing 52 and together form the separately embodied structural unit 31, which is introduced as a unit into the housing 16 in a single mounting step. In the blocked state shown, the first and second blocking elements 32 and 34 axially mesh with one another, and as the restoring element 42 for pressing against the second blocking element 34, individual spring elements 43 are located in corresponding receptacles in the coil holder 46. The receptacles are simultaneously embodied as axial guide elements 78, which mesh with corresponding counterpart elements 80 of the blocking element 34. As a result, the torque in the blocked state can be diverted from the first blocking element 32 to the second blocking element 34 via the coil holder 46 in the barrier housing 52 to the housing 16 of the gear-drive unit 10. For supplying current to the electromagnet 44, electrically conductive spring elements 89, which serve as electrical contacting means 56 and which extend in the axial direction, are disposed from one face end 88 of the electromagnet 44.

In this version, a roller bearing 18 in the housing 16 is embodied as a loose bearing, which is connected to the housing 16 in a manner fixed against relative rotation by an outer ring 90 and which with an inner ring 92 receives the drive shaft 14. The housing 16 is extruded from aluminum, for instance. The roller bearing 18, which is embodied as a ball bearing 19, is inserted here into a bearing receptacle 17 and is axially secured, by means of the barrier housing 52 resting resiliently on the outer ring 90, together with this barrier housing, for instance by means of caulking or press-fitting. Upon assembly of the gear-drive unit 10, the structural unit 31 of the blocking device 30 is located on the roller bearing 18 in such a way that the first blocking element 32 is braced axially on a stop 74 that is formed by the inner ring 92. Next, the drive shaft 14 with the slaving means 66 is introduced through the central opening 64 of the blocking device 30 and into the inner ring 92, until the first blocking element 32 is axially braced on a further stop 74 of the drive shaft 14. This second stop 74 is embodied in this exemplary embodiment as collar 94 extending all the way around the slaving means 66. In order to compensate for axial shifting of the drive shaft 14, an axial spring 96 is located between the collar 94 and the first blocking element 32. Because of the prestressing of the axial spring 96, the positioning of the armature shaft 14 relative to the blocking device 30 need not be highly precise, which greatly simplifies the assembly of the gear-drive unit 10. In this embodiment of the blocking device 30 as a separate structural unit 31, the reliable axial fixation of the rotatable blocking element 32 is thus likewise assured at minimal effort and expense of assembly. In this arrangement, the drive shaft 14 is supported by at least one further fixed bearing, not shown, and the axial play—caused by thermal expansion or material wear or assembly tolerances—is compensated for by the elastic axial supporting of the first blocking element 32. The transmission of force from the drive shaft 14 to the first control element 32 is again effected via a form lock between the slaving means 66 and the blocking disk 32, and stringent demands for precision need not be made of them. In order to be built in, the barrier housing 52 has a collar 53 of larger diameter, which forms a press fit with the housing 16.

Figure 5:
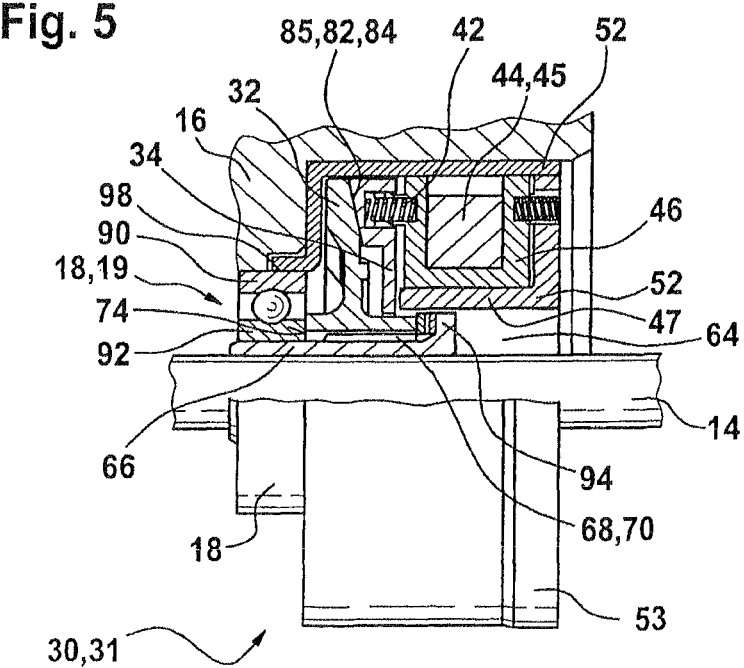
FIG. 5 shows a further variation of the version in FIG. 4.

FIG. 5 shows a variation of FIG. 4, in which the roller bearing 18 is integrally formed, as part of the blocking device 30, onto the barrier housing 52. To that end, the barrier housing 52 has a receptacle 98, into which the outer ring 90 of the roller bearing 18 is press-fitted or secured in a manner fixed against relative rotation in some other known way. As a result, the roller bearing 18 is a component of the structural group 31 and can be inserted in a single assembly step along with the blocking device 30 into the housing 16. Once again, the inner ring 92 forms the radial stop 74 for the first blocking element 32, and both of them in rotary operation revolve jointly with the drive shaft 14. Upon assembly of the armature shaft 14, the slaving means 66 is first thrust through the central opening 64 in the control element 32 and then through the inner ring 92. The slaving means 66 then forms a clearance fit with the inner ring 92 and a form lock, such as a toothing 68, 70, with the blocking disk 32. The blocking elements 32 and 34 in their rotating state have a spacing between the sets of teeth 82, 84 of for instance approximately 0.4 mm, and a spacing between the rotationally fixed control element 34 and the coil holder 46 of approximately 1 mm. If this blocking device 30 is embodied as a separate structural group 31, the tolerances in these dimensions can be monitored by means of a prior function test, for instance by measuring the power demand in the rotating state. In the exemplary embodiment, the electromagnet 44 comprises a coil 45, which is wound onto the coil holder 46. The coil holder 46 is located on a yoke 47, on which the second, rotationally fixed blocking element 34 rests in the rotating state, when the magnet 34 is being supplied with current. In the blocked state, when the control element 34 is pressed in form-locking fashion against the blocking element 32 by the restoring element 42, a gap of approximately 1 mm results between the blocking element 34 and the yoke 47. The form lock 85 between the two blocking elements 32, 34 is embodied as a plane or oblique toothing 85 and has for instance approximately 40 detent positions.

It should be noted that with regard to the exemplary embodiments shown in the drawings and described here, manifold possible combinations of the various characteristics may be made. For instance, the specific design of the form lock 85 between the first and second blocking elements 32, 34 as well between the slaving means 66 and the blocking element 32 may be varied arbitrarily and adapted to the demands made, particularly with regard to vibration and jarring stresses. The rotational securing of the second blocking element 34 and its magnetic disengagement and restoring device 42, 43 can also be designed arbitrarily (with a plurality of individual magnets 44). The axial fixation of the rotatable blocking element 32 inside the barrier housing 52 can likewise be assured by way of variously shaped stops of the barrier housing 52, the drive shaft 14, or the shaft bearings 18, 20 (loose or fixed bearings). Preferably, the gear-drive unit 10 of the invention is used for actuating a differential gear of a vehicle that is exposed for instance to a jarring stress of 20 g. The blocking device 30 of the invention may, however, also be used for other electric motors 12, such as control drives that are exposed to high temperature and vibrational stresses.

The invention claimed is:

1. A blocking device (30) for blocking a rotary motion of a shaft (14) relative to a housing (16) of a gear-drive unit (10) in a blocking state, the blocking device (30) having a first blocking element (32) and a second blocking element (34), where the second blocking element (34) is displaceable relative to the first blocking element (32) using an electromagnet (44) and a restoring element (42), wherein the blocking elements (32, 34) each have radially extending indentations (82) and radially extending raised areas (84), positioned about an outer radial surface portion proximate each blocking element's circumferential edge, wherein each radially extending indentation and raised area pair on one blocking surface is positioned to oppose each radially raised area and extending indentation pair on the other blocking surface, enabling the blocking elements to mesh with one another in an axial direction and in a form-locking fashion to block the rotary motion of the shaft (14) in the blocking state, wherein the blocking device (30) is embodied as a separate, independent structural unit (31) comprising a barrier housing (52) configured as a stop disk (60) forming at least one axial stop (74) for the first blocking element (32), which barrier housing (52) is mounted as a separate independent structural unit (31) to the housing (16), wherein the first blocking element (32) is embodied as a rotatable disk with a central opening (64), an inner toothing (68) configured to engage corresponding outer toothing (70) of a slaving means (66) first secured to the shaft (14), which shaft (14) with slaving means (66) is then thrust into the blocking element (32) in a manner fixed against relative rotation to effect installation in a way that axial positioning of the drive shaft relative to the blocking device is not vulnerable to tolerances; and wherein the first blocking element (32) includes axial extensions (62, 61, 63) that form a detent hook (61).

2. The blocking device (30) as defined by claim 1, wherein the electromagnet (44) is supplied with current to overcome the restoring forces of the restoring element (42, 43) in the rotating state, in order to detach the second blocking element (34) axially from the first blocking element (32).

3. The blocking device (30) as defined by claim 1, wherein the axial extensions (62, 61, 63) are braced on the at least one axial stop (60, 74) of the barrier housing (52).

4. The blocking device (30) as defined by claim 1, wherein the axial extensions (62, 61, 63) are braced on both sides of the stop disk (60) in such a way that an axial engagement of the two blocking elements (32, 34) with one another in rotary operation is prevented.

5. The blocking device (30) as defined by claim 1, characterized in that the electromagnet (44) is located in a coil holder (46), on which axial guide elements (78) are formed for axial guidance and/or prevention of relative rotation of the second blocking element (34), which axial guide elements (78) engage corresponding counterpart elements (80) of the second blocking element (34).

6. The blocking device (30) as defined by claim 1, characterized in that at least the second blocking element (34) of the two blocking elements (32, 34) is made at least in part of plastic, such as an elastomer.

7. A blocking device (30) for blocking a rotary motion of a shaft (14) relative to a housing (16) of a gear-drive unit (10) in a blocking state, the blocking device (30) comprising:

a first, rotatable blocking element (32) embodied as a disk with a central opening (64) with axial extensions (62, 61, 63);

a second blocking element (34) embodied as a disk and connected to housing 16 in a manner fixed against rotation;

an electromagnet (44); and a restoring element (42, 43);

wherein the second blocking element (34) is displaceable relative to the first blocking element (32) using the electromagnet (44) and the restoring element (42), wherein the blocking device (30) is embodied as a separate, independent structural unit (31) comprising a barrier housing (52) mounted to the housing (16), wherein a slaving means (66) is secured to the shaft (14);

wherein the shaft (14) is passed through a central opening (64) with the slaving means 66 secured thereto fixing the blocking element (32) against relative rotation, wherein the barrier housing (52) is configured as a stop disk (60) forming at least one axial stop (74) for the first, rotatable blocking element (32), wherein the axial extensions (62, 61, 63) of the first blocking element are braced on both sides of the stop disc (60) of the barrier housing (52) to mesh in the axial direction with one another by form-locking such that an axial engagement of the two blocking elements (32, 34) with one another in rotary operation is prevented, and wherein the axial extensions (62, 61, 63) form a detent hook (61).

\* \* \* \* \*